United States Patent [19]

Fazekas

[11] 4,031,778
[45] June 28, 1977

[54] DRIVE SYSTEM

[75] Inventor: David Stephen Fazekas, Oakville, Canada

[73] Assignee: The International Nickel Company, Inc., New York, N.Y.

[22] Filed: July 11, 1975

[21] Appl. No.: 595,300

[30] Foreign Application Priority Data

Aug. 28, 1974 Canada .............................. 208027

[52] U.S. Cl. ............................. 74/571 L; 74/600; 92/13.3; 417/215; 417/539
[51] Int. Cl.² ..................... G05G 5/04; F15B 15/24
[58] Field of Search ........................... 92/13.3, 13.7; 74/571 R, 600, 571 L, 571 M; 417/221, 539, 215

[56] References Cited
UNITED STATES PATENTS

| 869,143 | 10/1907 | Phillips | 74/571 L |
|---|---|---|---|
| 1,191,230 | 7/1916 | Rich | 74/571 L |
| 1,987,518 | 1/1935 | Reilly | 74/571 R |
| 2,285,534 | 6/1942 | Ryan | 74/571 R |
| 2,293,695 | 8/1942 | Bloosevitch | 74/571 L |
| 2,369,867 | 2/1945 | Sprake | 417/215 |
| 2,503,907 | 4/1950 | Hefler | 92/13.7 |
| 2,594,836 | 4/1952 | Wunderlich | 74/571 L |
| 2,890,656 | 6/1959 | Kohtaki | 417/215 |
| 3,470,823 | 10/1969 | Seeger | 74/571 |
| 3,678,781 | 7/1972 | Rohrberg | 74/571 M |
| 3,738,230 | 6/1973 | Censi | 92/13.7 |
| 3,835,797 | 9/1974 | Franks | 74/571 |

Primary Examiner—William R. Cline
Assistant Examiner—Abraham Hershkovitz
Attorney, Agent, or Firm—Miriam W. Leff; Ewan C. MacQueen

[57] ABSTRACT

A double-eccentric variable drive system is disclosed comprising a drive shaft, two eccentrics mounted on the drive shaft to be driven thereby, and means for varying the eccentricity of both of the eccentrics simultaneously. The means in question comprises a spindle having left-hand screw-threads on one end thereof and right-hand screw-threads on the other end thereof and an enlarged central portion rotatably mounted in the shaft but radially fixed relative thereto. The eccentrics each have a radial bore therethrough tapped to correspond with and receive the threads of the spindle, the bores being aligned on opposite sides of the shaft. Each eccentric has an axial bore larger than the diameter of the shaft in a direction parallel to the spindle to allow for movement of the eccentrics radially of the shaft. The arrangement is such that rotation of said spindle in one direction will simultaneously increase the eccentricity of both of the eccentrics relative to the shaft and rotation of the spindle in the other direction will simultaneously decrease the eccentricity of both of the eccentrics relative to the shaft. Preferably, the eccentrics each have a dovetail slide and a diametrically opposite dovetail, the dovetail of one eccentric slidably engaging in the dovetail slide of the other eccentric and vice versa, each dovetail having said radial bore passing therethrough. The system is particularly adapted for use in solvent extraction.

4 Claims, 4 Drawing Figures

DRIVE SYSTEM

This invention relates to a drive system particularly adapted for use, for example, in solvent extraction although, of course, there may be many other fields of application for the invention.

It is an object of the invention to provide a drive system for translating rotary movement to reciprocating movement to drive a pair of pistons in associated cylinders in a balanced manner without vibrations and to provide for fine adjustment of the piston stroke in a simple manner.

According to the invention there is provided a double-eccentric variable drive system comprising a drive shaft, two eccentrics mounted on said drive shaft to be driven thereby, and means for varying the eccentricity of both of said eccentrics simultaneously, said means comprising a spindle having left-hand screw-threads on one end thereof and right-hand screw-threads on the other end thereof, said spindle having an enlarged central portion rotatably mounted in said shaft but radially fixed relative thereto, said eccentrics each having a radial bore therethrough tapped to correspond with and receive the threads of said spindle, said bores being aligned on opposite sides of said shaft, each eccentric having an axial bore larger than the diameter of the shaft at least in a direction parallel to said spindle to allow for movement of the eccentrics radially of the shaft, whereby rotation of said spindle in one direction will simultaneously increase the eccentricity of both of said eccentrics relative to said shaft and rotation of said spindle in the other direction will simultaneously decrease the eccentricity of both of said eccentrics relative to said shaft.

Preferably, said eccentrics each have a dovetail slide and a diametrically opposite dovetail, the dovetail of one eccentric slidably engaging in the dovetail slide of the other eccentric and vice versa, each dovetail having said radial bore passing therethrough.

In a presently preferred embodiment the shaft has a cruciform slot extending inwardly from an end thereof to receive the central portion of said spindle, said shaft being strengthened by a cruciform member inserted in said slot after the central portion has been placed in the slot.

The eccentrics may have their mutually remote faces engaged by clamping rings, one of which is adjacent the end of the shaft and engaged by a clamping nut screwed on that end while the other engages a collar on the shaft.

Each of the eccentrics preferably has an annular surface carrying a bearing which in turn carries a connecting rod for driving a piston.

An embodiment of the invention will now be described, by way of example, with reference to the accompanying drawings, in which.

Figure 1:
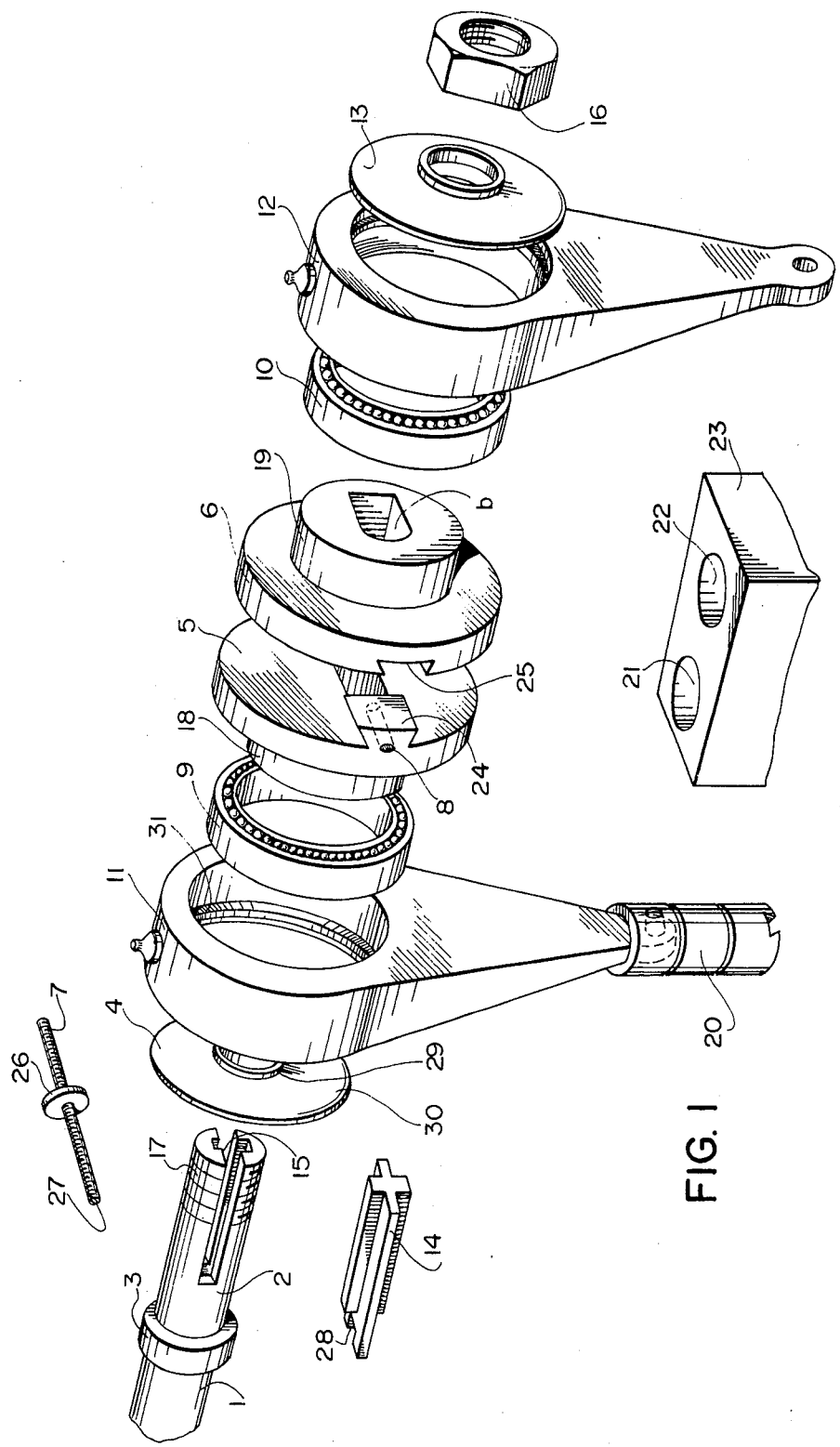
FIG. 1 is an exploded perspective view of a drive system embodying the invention.
Figure 2:
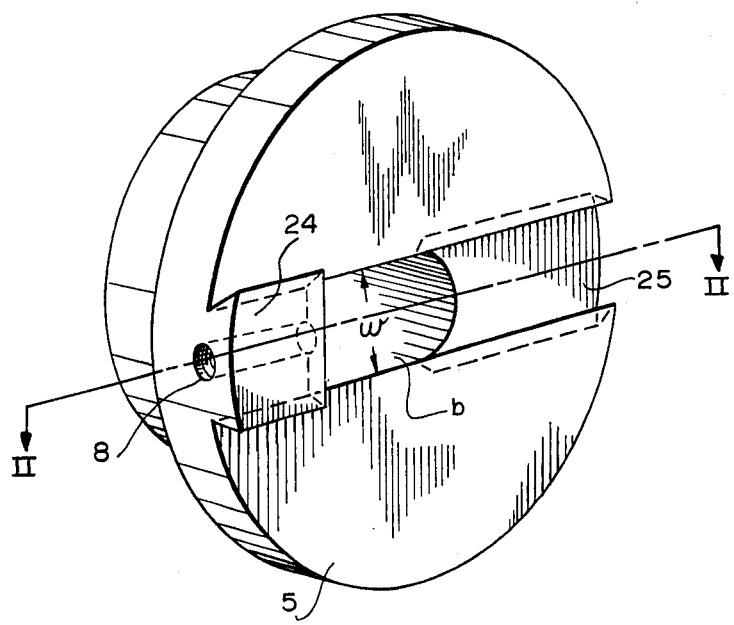
FIG. 2 is a perspective view of one of the eccentrics shown in FIG. 1.
Figure 3:
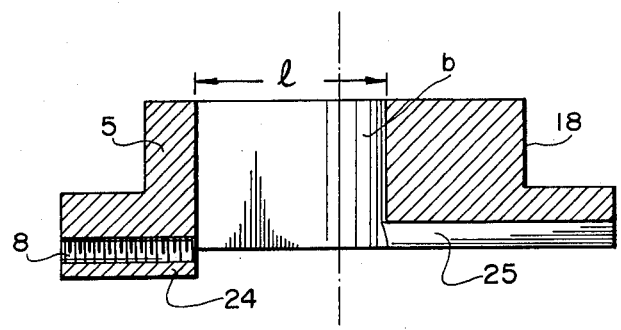
FIG. 3 is an axial section through the eccentric shown in FIG. 2, taken along the line II—II of that Figure.

The drive system shown has a shaft 1 driven by a suitable source of power (not shown) and suitably supported in bearings (not shown) to have a free end portion 2 beyond a shoulder 3. A clamping ring 4 may be slid on to and along the end portion 2 to abut the shoulder 3. An assembly including eccentrics 5 and 6, with spindle 7 engaged in threaded bores, one of which is shown at 8, roller bearings 9 and 10 and connecting rods 11 and 12 can then be slid on to and along end portion 2 to abut clamping ring 4. Clamping ring 13 can then be slid on to and along end portion 2 to abut said assembly, the cruciform member 14 can be inserted in slot 15 in end portion 2 to strengthen the latter and the nut 16 can be screwed onto the threaded end 17 of the shaft to clamp the eccentrics between the clamping rings so that they are forced to rotate with the shaft. It will be noted that each of the eccentrics has an annular surface 18,19 on which the bearings 9,10 are mounted, the connecting rods 11,12 in turn being mounted on the bearings.

Each connecting rod has a piston, one of which is shown at 20, mounted on its lower end and these pistons work in cylinders 21,22 in cylinder block 23. The eccentrics 5 and 6 are displaced from concentricity with the shaft 1 by equal and opposite amounts so that as one piston is on its downward stroke the other is on its upward stroke, the result being a balanced, vibration-free drive system for the pistons.

Figure 4:
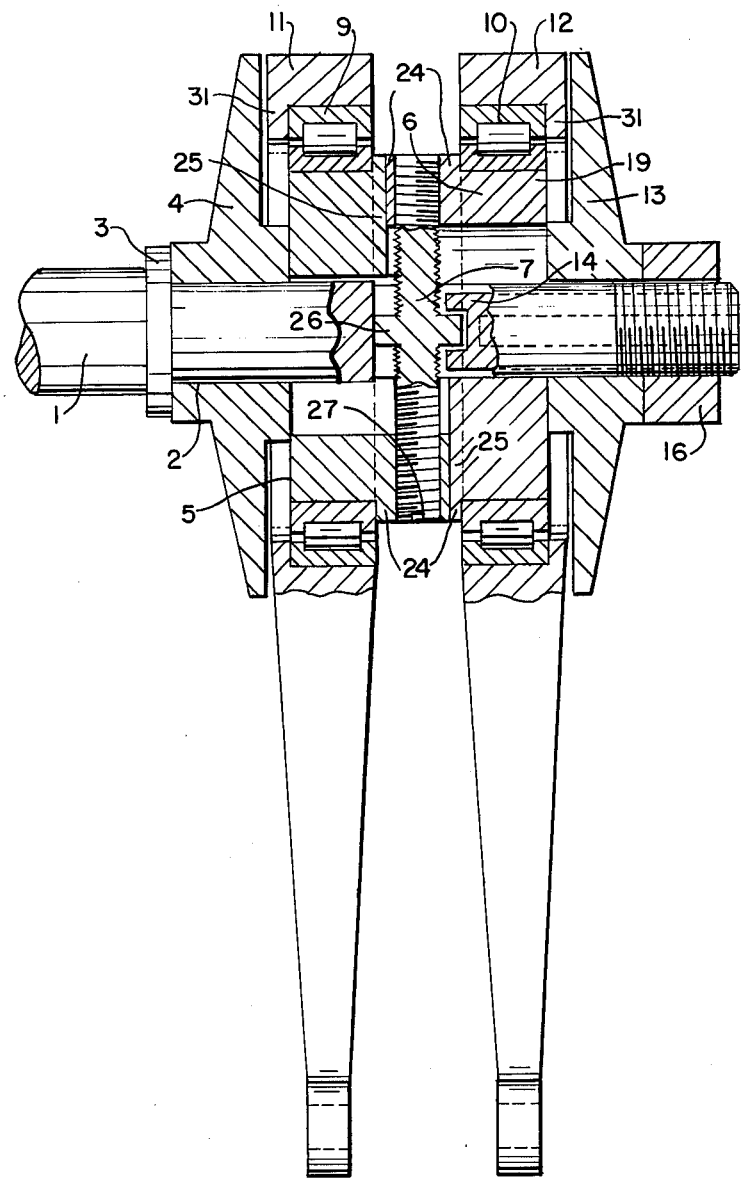
FIG. 4 is an axial sectional view of the assembled drive system.

The system is specially adapted to permit fine adjustment of the stroke of the pistons and for this purpose each of the eccentrics has an elongated bore $b$ with a width $w$ just sufficient to receive the shaft 1 and a length $l$ which is considerably greater than its width. Each eccentric also has a dovetail 24 and a diametrically opposite dovetail slide 25 at the ends of the bore, the dovetail of one eccentric engaging in the dovetail slide of the other eccentric and vice versa. The dovetail of one eccentric has a tapped bore 8 with a left-hand thread and the dovetail of the other eccentric has a similar tapped bore but with a right-hand thread. Correspondingly, one end of spindle 7 has right-hand threads thereon and the other end has left-hand threads so that, with the spindle engaged in the bores, rotation of the spindle in one direction will cause the axes of the eccentrics to move closer together whereas rotation of the spindle in the opposite direction will cause them to move further apart. This, of course, with the central portion 26 of the spindle located in the slot 15 and thus restrained against radial movement relative to the axis of the shaft, will result in equal and opposite displacements of the axes if eccentrics relative to the axis of the shaft and, accordingly, adjustment of the stroke of both pistons by an equal amount although the pistons are operating in opposite directions at any given moment. When it is desired, therefore, to alter the stroke, it is a simple matter to loosen the nut 16, insert the end of a screw-driver into the groove 27 provided in the end of the spindle and rotate it in the desired direction by the desired amount, subsequently tightening the screw again to clamp the eccentrics in their adjusted positions. Each clamping ring 4, 13 has a central annular projection 29, to engage the end face of an eccentric, and an outer rim 30 overlapping a connecting rod, as clearly shown in FIG. 4. Also, as clearly shown in that Figure, each connecting rod has an inwardly directed flange portion 31 engaging the outer ring of its associated bearing.

The strengthening insert member 14 has a slot 28 in the inner end thereof to accommodate the central portion 26 of the spindle.

The cylinder block 23 may be part of a solvent extraction installation but the invention, of course, is not limited to use in such installations. It may be used, for example, with double vane-type feed lines for materials or liquids or in double and single pulse pumps for liquids and gases driven directly or indirectly with variable speeds or strokes or it may be used in double twin uses, in circular, horizontal or vertical fashion for piston pumps.

What is claimed is:

1. A double-eccentric variable drive system comprising a drive shaft, two eccentrics mounted on said drive shaft to be driven thereby, and means for varying the eccentricity of both of said eccentrics simultaneously, said means comprising a spindle having left-hand screw-threads on one end thereof and right-hand screw-threads on the other end thereof, said spindle having an enlarged central portion rotatably mounted in said shaft but radially fixed relative thereto, said eccentrics each having an annular surface carrying a bearing which in turn carries a connecting rod and said eccentrics each having a radial bore therethrough tapped to correspond with and receive the threads of said spindle, said bores being aligned on opposite sides of said shaft, each eccentric having an axial bore larger than the diameter of the shaft at least in a direction parallel to said spindle to allow for sliding movement of the eccentrics with respect to each other radially of the shaft, means for rotating said spindle in one direction to simultaneously increase the eccentricity of both of said eccentrics relative to said shaft and for rotating said spindle in the other direction to simultaneously decrease the eccentricity of both of said eccentrics relative to said shaft.

2. A double-eccentric variable drive system as claimed in claim 1, wherein said eccentrics each have a dovetail slide and a diametrically opposite dovetail, the dovetail of one eccentric slidably engaging in the dovetail slide of the other eccentric and vice versa, each dovetail having said radial bore passing therethrough.

3. A double-eccentric variable drive system as claimed in claim 1, wherein said shaft has a cruciform slot extending inwardly from an end thereof to receive the central portion of said spindle, said shaft being strengthened by a cruciform member inserted in said slot after the central portion has been placed in the slot.

4. A double-eccentric variable drive system as claimed in claim 1, wherein said eccentrics have their mutually remote faces engaged by clamping rings, one of which is adjacent the end of the shaft and engaged by a clamping nut screwed on that end while the other engages a collar on the shaft.

* * * * *